June 11, 1929.  C. A. BECK  1,716,946
UNDERCUTTER
Filed April 5, 1927  2 Sheets-Sheet 1

Carl A. Beck, Inventor

Witnesses

By Richard B. Owen
Attorney

June 11, 1929.  C. A. BECK  1,716,946
UNDERCUTTER
Filed April 5, 1927   2 Sheets-Sheet 2
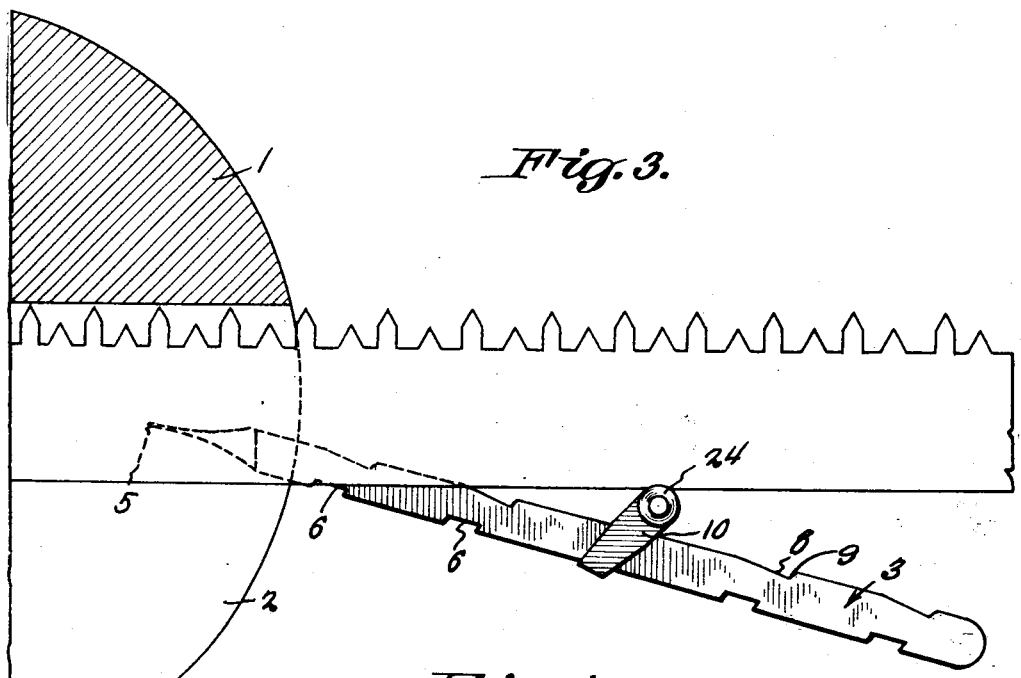
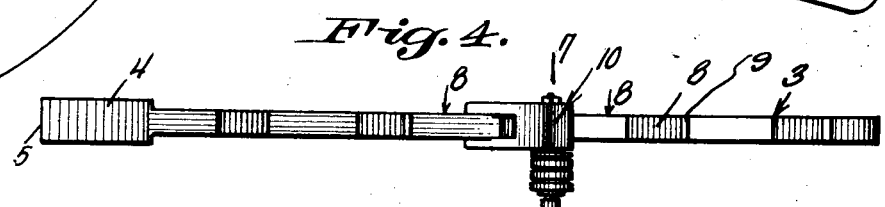
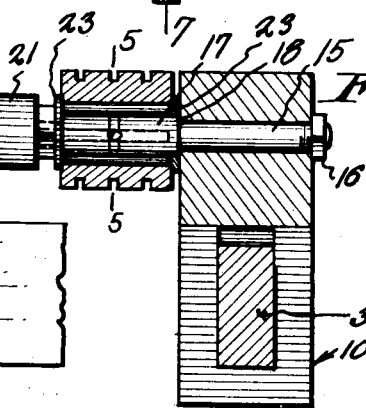
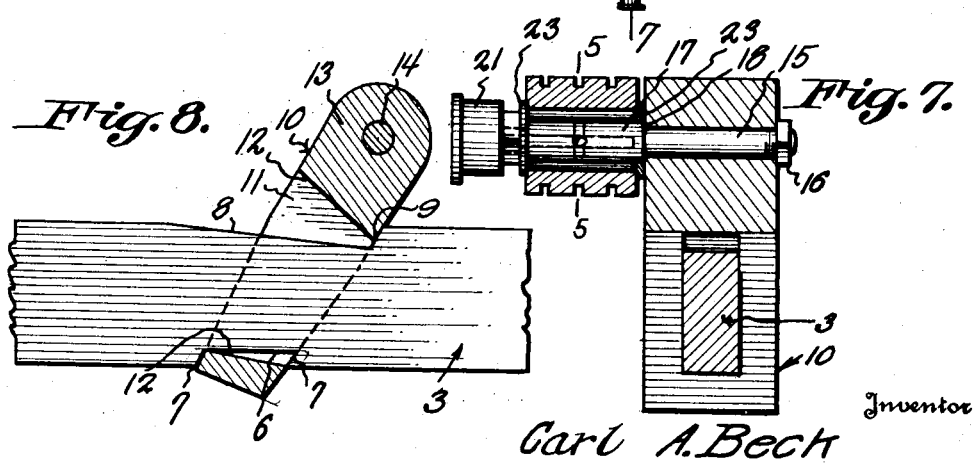
Inventor
Carl A. Beck
By Richard B. Owen
Attorney
Witnesses Patented June 11, 1929.

1,716,946

UNITED STATES PATENT OFFICE.

CARL A. BECK, OF CHERRYVILLE, OREGON.

UNDERCUTTER.

Application filed April 5, 1927. Serial No. 181,232.

This invention relates to the class of wood sawing and pertains particularly to a device designed to be used in connection with cross cut saws, under certain conditions, for undercutting the logs.

The primary object of the present invention is to provide, in a manner as hereinafter set forth, an undercutter which will enable the user of a cross cut saw to cut through the log from the under side of the same when the log is so positioned that each end is supported and to attempt to cut therethrough from the upper side would pinch and bind the saw between the cut ends of the log.

Another object of the invention is to provide, in a manner as hereinafter set forth, an undercutter device which can be easily and quickly adjusted to move the saw up into position as a cut is made in the log so that the proper engagement between the saw and log can be maintained at all times for quickly cutting the log.

Another object of the invention is to provide an under cutter of the above described character having adjustable means for supporting a saw in position which will offer the least amount of resistance to the operation of the saw and with or from which the saw can be easily and quickly engaged or disengaged.

A further and final object of the present invention is to provide an undercutter device of the character described which can be easily and quickly fixed in position by attachment directly to the log to be operated upon, and which will be strong, durable and comparatively inexpensive to manufacture.

Numerous other objects and advantages of the present invention will become apparent as the description of the same proceeds and the invention will be best understood from a consideration of the following detailed description taken in connection with the accompanying drawing forming a part of this specification, with the understanding, however, that the invention is not confined to any strict conformity with the showing of the drawings, but may be changed or modified so long as such changes or modifications mark no material departure from the salient features of the invention as expressed in the appended claim.

In the drawings:

Figure 3 is a side elevational view of the undercutter device shown in inverted position for supporting the saw for meeting certain working conditions.

Figure 4 is a plan view of the undercutter device in the position shown in Figure 3.

Figure 7 is a transverse section taken substantially upon the line 7—7 of Figure 4.

Figure 8 is a longitudinal section taken substantially upon the line 8—8 of Figure 4.

Figure 1:
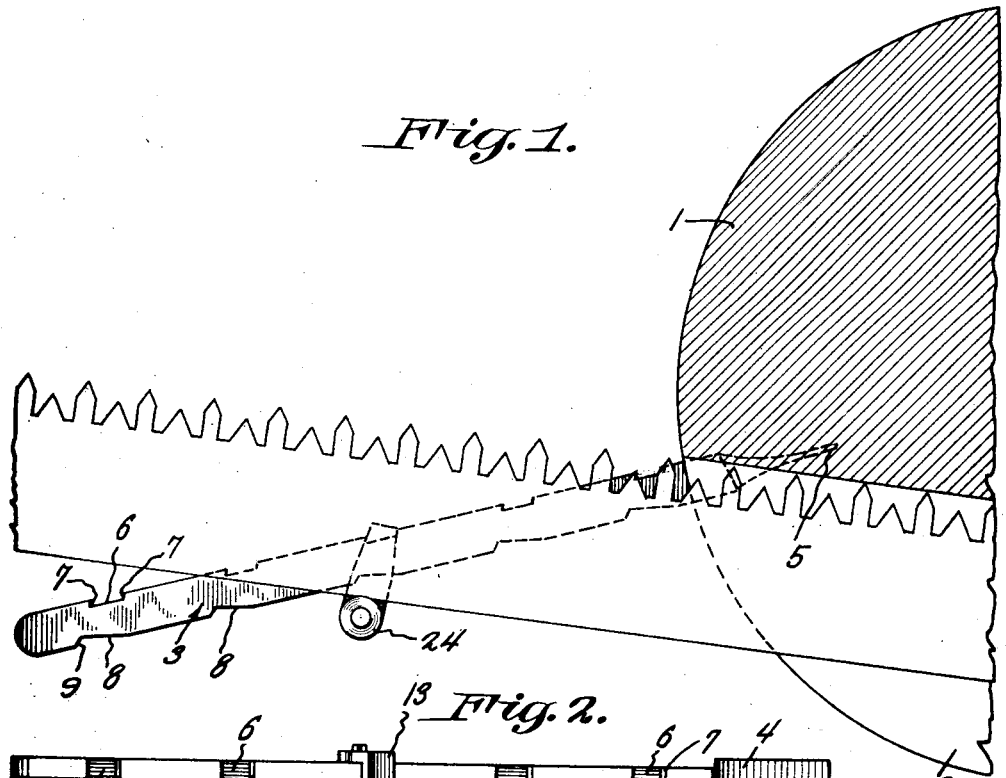
Figure 1 is a side elevational view of the device embodying this invention shown in association with a log, shown in partial cross section, and supporting a saw in operative position.
Figure 2:
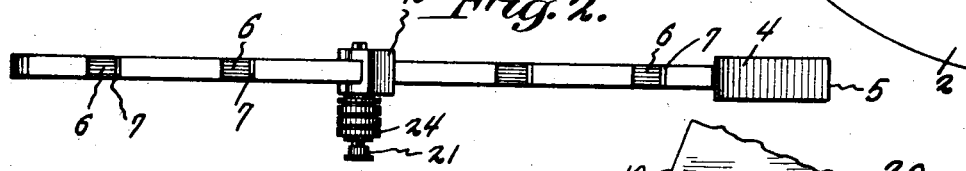
Figure 2 is a top plan view of the device in the position shown in connection with Figure 1.
Figure 5:
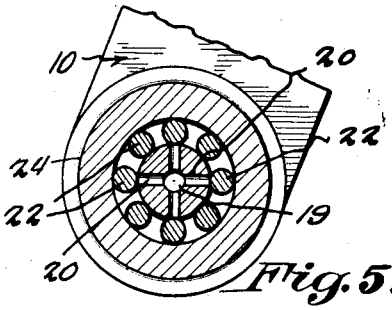
Figure 5 is a sectional view taken upon the line 5—5 of Figure 7.

Referring now to the drawings in detail wherein like numerals of reference indicate corresponding parts throughout the several views, numeral 1 in each of the views 1 and 3 indicates a portion of a log shown in transverse section, the logs being shown as having a cut 2 made therein, transversely thereof, from the under side upwardly.

Figure 6:
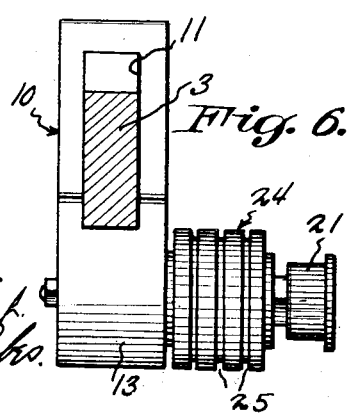
Figure 6 is an enlarged side elevational view of the saw supporting pulley.

The device embodying this invention comprises an elongated bar indicated as a whole by the numeral 3 preferably formed of steel and of a width substantially twice as great as the thickness thereof as shown in Figures 6 and 7. One end of the bar 3 is formed to set up the relatively broad flat penetrating head 4, the forward edge of which is sharpened as indicated by the numeral 5.

One longitudinal edge of the bar 3 is provided with a series of spaced recesses 6, the side walls 7 of which are substantially parallel and inclined from the outer edge of the bar inwardly and toward the rear end of the bar.

The other edge of the bar is provided with a plurality of spaced notches 8 which are cut thereinto and increase in depth toward the rear end of the bar and the shoulder or transverse walls 9 of each of these notches is also inclined and substantially parallel with the inclined walls 7 of the recesses 6, upon the opposite edge of the bar. As will also be seen, the recesses 6 are each a little in advance of the opposite notch 8. The purpose of this will be readily seen as the description proceeds.

Designed to engage over the bar is a yoke member indicated as a whole by the numeral 10, being provided with the passage 11 therethrough to receive the bar member 3. As will be readily seen upon reference to Figure 8, the passage 11 is of greater width on the side of the yoke than at the other, the walls 12 extending at an angle with respect to the side edges of the yoke.

One end 13 of the yoke 10 is of solid construction and has a transverse aperture formed therethrough as indicated by the numeral 14 to receive the spindle 15. A nut 16 is threaded upon one end of the spindle to hold the same in position in the passage 14, and, as will be readily seen upon reference to Figure 7, the other end of the spindle which projects a substantial distance beyond the side of the yoke, is of slightly greater diameter as indicated at 17, thus setting up a shoulder 18 which bears against one side of the portion 13 of the yoke. That section 17 of the spindle, which extends laterally from the side of the yoke 10 is provided with a longitudinally extending grease passage 19 which opens through the free outer end of the spindle and is further provided with a plurality of laterally extending passages 20 which pass grease from the central passage 19 to the peripheral surface of the spindle portion 17. The outer end of the spindle portion 17 is formed to receive the grease cup 21 by means of which grease is formed into the passage 19 in the usual manner.

Surrounding the portions 17 of the spindle, are roller bearings 22 which are held in position longitudinally of the spindle by the rings 23. Rotatably mounted upon the bearing rollers 22 and held in position thereon between the rings or collars 23 is a saw supporting pulley 24 which is provided with a plurality of circumferentially extending grooves 25 in which the back edge of a saw is designed to engage.

Reference to Figures 1 and 3 will clearly show the manner in which the present undercutting device is designed to be used, and it will be seen that the pointed end 5 of the bar is driven into a log so that the bar will extend therefrom at a downward inclination and the yoke 10 is then slipped over the bar and engaged in one of the recesses 6, preferably the one nearest the outer end of the bar when beginning a cut upon the log. As the cut portion of the log deepens toward the upper side, the yoke is moved forwardly toward the head end of the bar and, due to the inclination at which the bar is fixed, consequently lifts the saw a little higher each time it is moved forward a notch, or recess.

The position in which the device is shown in Figure 1 is the usual position in which it is used, with the roller or pulley 24 extended below the bar by the yoke 10. When in this position, the back edge of the saw is placed in one of the grooves 25 and as will be readily understood upon pressing downwardly upon the outer end of the saw, the inner end will be raised against the under side of the log. Movement of the saw transversely of the log is made easy due to the manner in which the roller or pulley 24 is mounted upon the yoke 10 and thus with a device of this character the cutting of a log from the under side is easily accomplished.

Under certain conditions, pertaining particularly to the manner in which the log is lying and the manner in which the sections are apt to fall apart upon completion of a cut, it is desirable to raise the saw above the bar 3, as shown in Figure 3. When this is desired, the yoke is removed and reversed as shown to position the pulley 24 above the bar. Due to the manner in which the notches 6 and recesses 8 are cut and associated the yoke member 10 is held firmly in set position, under all conditions and at all the positions of the saw.

Having thus described my invention, what I claim is:

An undercutter device comprising an elongated bar body having one end formed to set up a penetrating head and further having one longitudinal edge thereof provided with a series of spaced recesses and the opposite longitudinal edge provided with a series of spaced notches, said recesses each being positioned slightly forwardly of a notch, a yoke body comprising an elongated flat member having a passage formed therethrough and opening through the narrow faces thereof, through which said bar body is designed to extend, the end walls of said passage being angularly related to constrict the passage at one end, a laterally projecting spindle carried by said yoke body adjacent one end thereof, and a grooved roller member designed to receive the back edge of an inverted saw to maintain the same in working position, said yoke body when in working position being inclined with respect to the longitudinal center of said bar and having one edge of the passage adjacent the constricted end thereof engaging a notch and an edge at the opposite end of the passage engaging in a recess.

In testimony whereof I affix my signature.

CARL A. BECK.